US012725967B2

(12) United States Patent
Fujiwara et al.

(10) Patent No.: US 12,725,967 B2
(45) Date of Patent: Sep. 1, 2026

(54) ELECTRICAL CONNECTOR WITH PLUG AND SOCKET

(71) Applicant: OMRON Corporation, Kyoto (JP)

(72) Inventors: Taijiro Fujiwara, Kyoto (JP); Hirokazu Hoshino, Kyoto (JP); Masato Matoba, Kyoto (JP); Masahiro Ono, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 336 days.

(21) Appl. No.: 18/633,911

(22) Filed: Apr. 12, 2024

(65) Prior Publication Data

US 2024/0356277 A1 Oct. 24, 2024

(30) Foreign Application Priority Data

Apr. 20, 2023 (JP) ................................ 2023-069225

(51) Int. Cl.
*H01R 13/625* (2006.01)
*H01R 13/641* (2006.01)

(52) U.S. Cl.
CPC ......... *H01R 13/625* (2013.01); *H01R 13/641* (2013.01)

(58) Field of Classification Search
None
See application file for complete search history.

(56) References Cited

U.S. PATENT DOCUMENTS 10,361,512 B2 * 7/2019 Seido ................ H01R 13/5219
11,424,574 B1 * 8/2022 Huang ................ H01R 13/631
11,489,297 B2 * 11/2022 Houir Alami ...... H01R 13/7036
(Continued)

FOREIGN PATENT DOCUMENTS

CN 111937252 A 11/2020
DE 102019130628 B4 * 8/2021 ........... H01R 13/622
DE 102021107137 A1 * 9/2022 ........... H01R 13/622
(Continued)

OTHER PUBLICATIONS

EPO Extended European Search Report for corresponding EP Application No. 24169553.5; Issued Sep. 19, 2024.

*Primary Examiner* — Tho D Ta
(74) *Attorney, Agent, or Firm* — CANTOR COLBURN LLP

(57) ABSTRACT

A connector includes a plug including a first connection member and a socket including a second connection member. The first connection member includes a first body portion and a claw portion. The second connection member includes a second body portion and a connection groove portion. The connection groove portion includes a first groove portion configured to guide movement of the claw portion in the first direction in a state where the second connection member is located at the first position and a second groove portion configured to restrict movement of the claw portion in the first direction and in a direction approaching the plug in a state where the second connection member is located at the second position. The second body portion includes a restricting portion configured to accommodate the claw portion and to restrict rotation of the socket with respect to the plug in the circumferential direction.

5 Claims, 7 Drawing Sheets

(56) References Cited

U.S. PATENT DOCUMENTS

| | | | | |
|---|---|---|---|---|
| 11,545,771 | B1 * | 1/2023 | Cook | A61B 5/6858 |
| 2009/0269958 | A1 | 10/2009 | Fujiwara et al. | |

FOREIGN PATENT DOCUMENTS

| | | | | |
|---|---|---|---|---|
| EP | 2937946 | A1 * | 10/2015 | H01R 13/623 |
| EP | 3467957 | A1 * | 4/2019 | H01R 43/26 |
| JP | 2007103046 | A | 4/2007 | |
| JP | 2022084437 | A | 6/2022 | |
| WO | WO-2012172845 | A1 * | 12/2012 | H01R 13/4364 |
| WO | WO-2019176663 | A1 * | 9/2019 | H01R 13/639 |

* cited by examiner

ELECTRICAL CONNECTOR WITH PLUG AND SOCKET

CROSS REFERENCE TO RELATED APPLICATIONS

The present invention claims priority under 35 U.S.C. § 119 to Japanese Application No. 2023-069225, filed on Apr. 20, 2023, the entire contents of which being incorporated herein by reference.

TECHNICAL FIELD

The present disclosure relates to a connector.

BACKGROUND ART

Patent Document 1 discloses a connector configured that an engagement protrusion is engaged along an engagement groove by relatively rotating a plug holder and a socket holder.

CITATION LIST

Patent Document

Patent Document 1: JP 2007-103046 A

SUMMARY

Problems to be Solved

In the connector of Patent Document 1, if a rotational operation start position is wrong, it is conceivable that the engagement protrusion engages with a portion other than the engagement groove. In this case, even when the plug and the engagement groove are pulled to each other, the plug and the socket cannot be removed even in a state where the lock mechanism due to the engagement between the engagement protrusion and the engagement groove is not operated, and a user may erroneously recognize that a connection between the plug and the socket is normally completed.

An object of the present disclosure is to provide a connector capable of preventing a user from erroneously recognizing that connection between a plug and a socket is normally completed.

Solution to the Problems

A connector according to one aspect of the present disclosure includes:

a plug including a first connection member; and a socket including a second connection member to which the first connection member is detachably connected from a first direction, the second connection member being configured to be rotatable with respect to the first connection member between a first position where the first connection member is detachable from the first direction and a second position where the first connection member is not detachable from the first direction in a circumferential direction with respect to a center line extending in the first direction, wherein the first connection member includes:

a first body portion that extends along the first direction; and a claw portion that protrudes from the first body portion in a radial direction with respect to the center line, the second connection member includes:

a second body portion that extends along the first direction and is configured to be connectable to the first body portion, a part of the second body portion being located outside the first body portion in the radial direction; and a connection groove portion which is located in a portion of the second body portion facing the first body portion and accommodates the claw portion, the connection groove portion includes:

a first groove portion that extends along the first direction from an end portion of the second body portion facing the first connection member and is configured to guide movement of the claw portion in the first direction in a state where the second connection member is located at the first position; and a second groove portion that is connected to an end portion of the first groove portion far from the first connection member in the first direction, extends along the circumferential direction, and is configured that the claw portion is movable in the circumferential direction, and is configured to restrict movement of the claw portion in the first direction and in a direction approaching the plug in a state where the second connection member is located at the second position, and the second body portion includes a restricting portion that is provided at a position different from the first groove portion at an end portion facing the first connection member and is configured to accommodate the claw portion and to restrict rotation of the socket with respect to the plug in the circumferential direction.

Advantageous Effects

According to the present disclosure, it is possible to achieve a connector capable of preventing a user from erroneously recognizing that connection between the plug and the socket is normally completed.

DETAILED DESCRIPTION

Hereinafter, an example of the present disclosure will be described with reference to the accompanying drawings. The following description is merely exemplary in nature and is not intended to limit the present disclosure, its applications, and uses of the present disclosure. The accompanying drawings are schematic, and ratios of dimensions and the like do not necessarily match actual ones.

Figure 1:
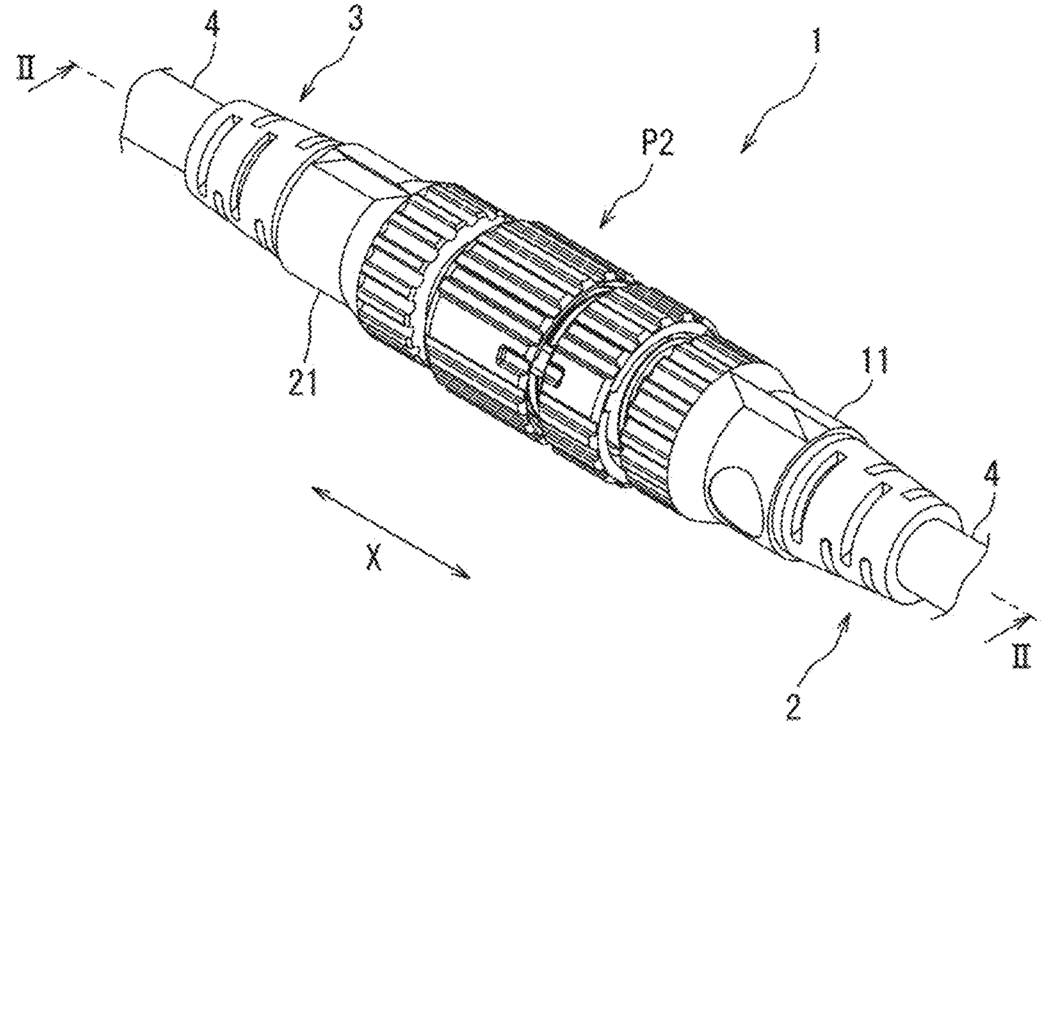
FIG. 1 is a perspective view illustrating a connector according to an aspect of the present disclosure.

As illustrated in FIG. 1, a connector 1 according to an aspect of the present disclosure includes a plug 2 and a socket 3 to which the plug 2 is detachably connected. The plug 2 includes a first connection member 10, and the socket 3 includes a second connection member 20 to which the first connection member 10 is detachably connected from a first direction (for example, an X direction). The plug 2 and the socket 3 are rotatably connected to each other via the first connection member 10 and the second connection member 20.

The socket 3 is configured to be rotatable with respect to the plug 2 between a first position P1 (see FIG. 5) and a second position P2 in a circumferential direction with respect to a center line CL (illustrated in FIG. 2) extending in a first direction (for example, in the X direction) that is an axial direction of the connector 1 (hereinafter, referred to as the circumferential direction). The first position P1 is a circumferential relative position of the second connection member 20 with respect to the first connection member 10 from which the first connection member 10 is detachable from the first direction X. The second position P2 is a circumferential relative position of the second connection member 20 with respect to the first connection member 10 from which the first connection member 10 cannot be detached from the first direction X.

Figure 2:
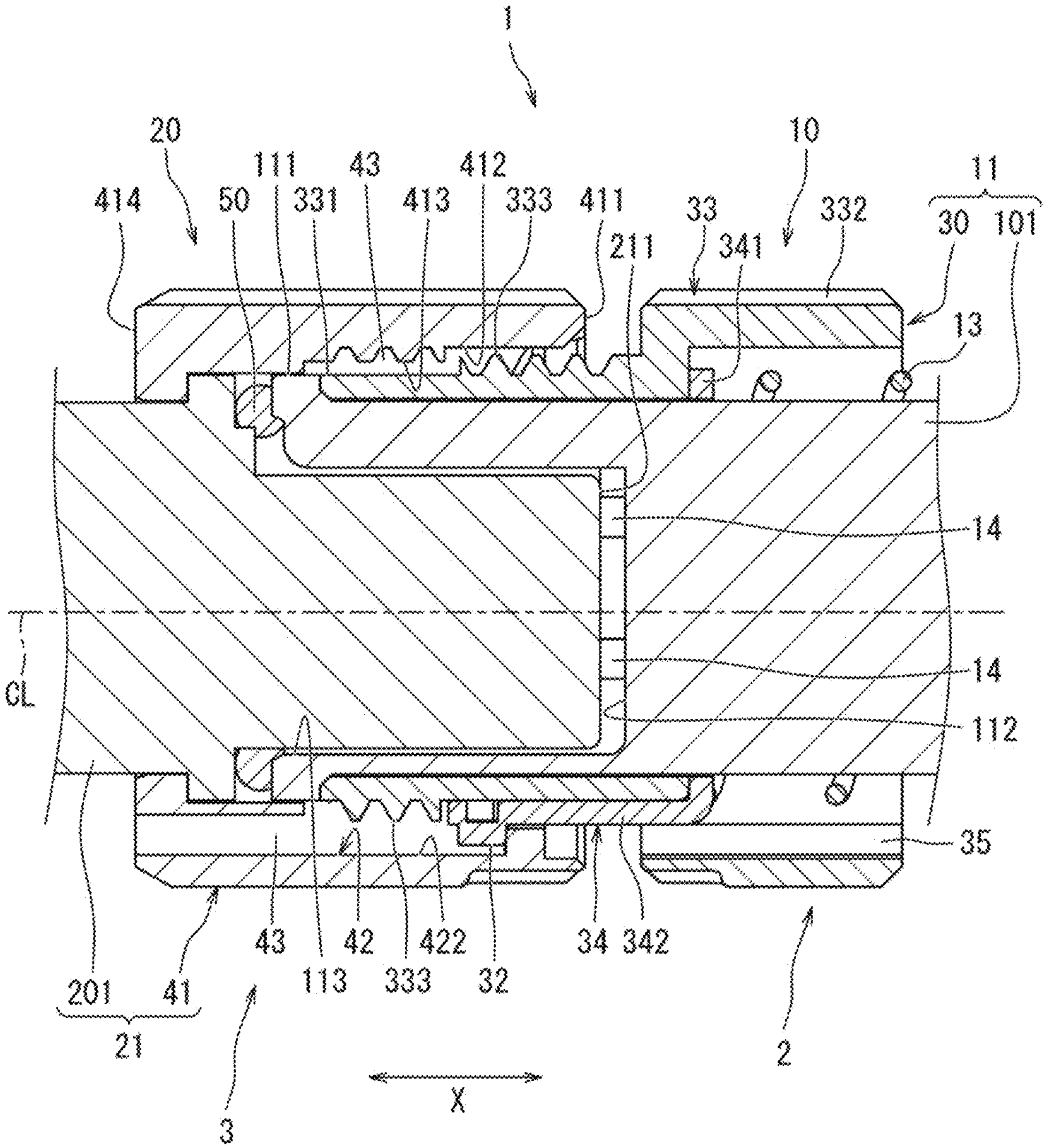
FIG. 2 is a cross-sectional view taken along line II-II of FIG. 1.

As illustrated in FIGS. 1 and 2, the first connection member 10 includes a first body portion 11 and claw portions 32 protruding from the first body portion 11 in a radial direction with respect to the center line CL (hereinafter, referred to as the radial direction). In the present aspect, the first body portion 11 includes a plug body 101, a plug-side connection member 30 located at an end portion 111 close to the socket 3 in the first direction X of the plug body 101, and a biasing member 13 (see FIG. 2).

As an example, the plug body 101 has a substantially cylindrical shape extending along the first direction X. As illustrated in FIG. 2, the end portion 111 of the plug body 101 is provided with a recess 112 in which a plurality of plug terminals 14 are accommodated. The recess 112 includes an opening 113 facing the socket 3. Each plug terminal 14 protrudes in the first direction X from a bottom surface of the recess 112. The cable 4 is connected to an end portion of the plug body 101 far from the second connection member 20 in the first direction X.

As illustrated in FIG. 2, the plug-side connection member 30 includes a first member 33 and a second member 34. In the present aspect, the first member 33 and the second member 34 are located outside the plug body 101 in the radial direction.

As an example, the first member 33 has a substantially cylindrical shape and includes a first portion 331 in contact with a part of the plug body 101 and a second portion 332 located farther from the socket 3 than the first portion 331 in the first direction X. A male screw 333 is provided in the first portion 331. A gap 35 is provided between the second portion 332 and the plug body 101 in the radial direction. A part of the second member 34 and the biasing member 13 are accommodated in the gap 35.

As illustrated in FIG. 2, the second member 34 includes a first portion 341 located in the gap 35 of the first member 33 and a second portion 342 located farther from the plug body 101 than the first member 33 in the radial direction. In the present aspect, the second member 34 is fixed to the first member 33.

Figure 3:
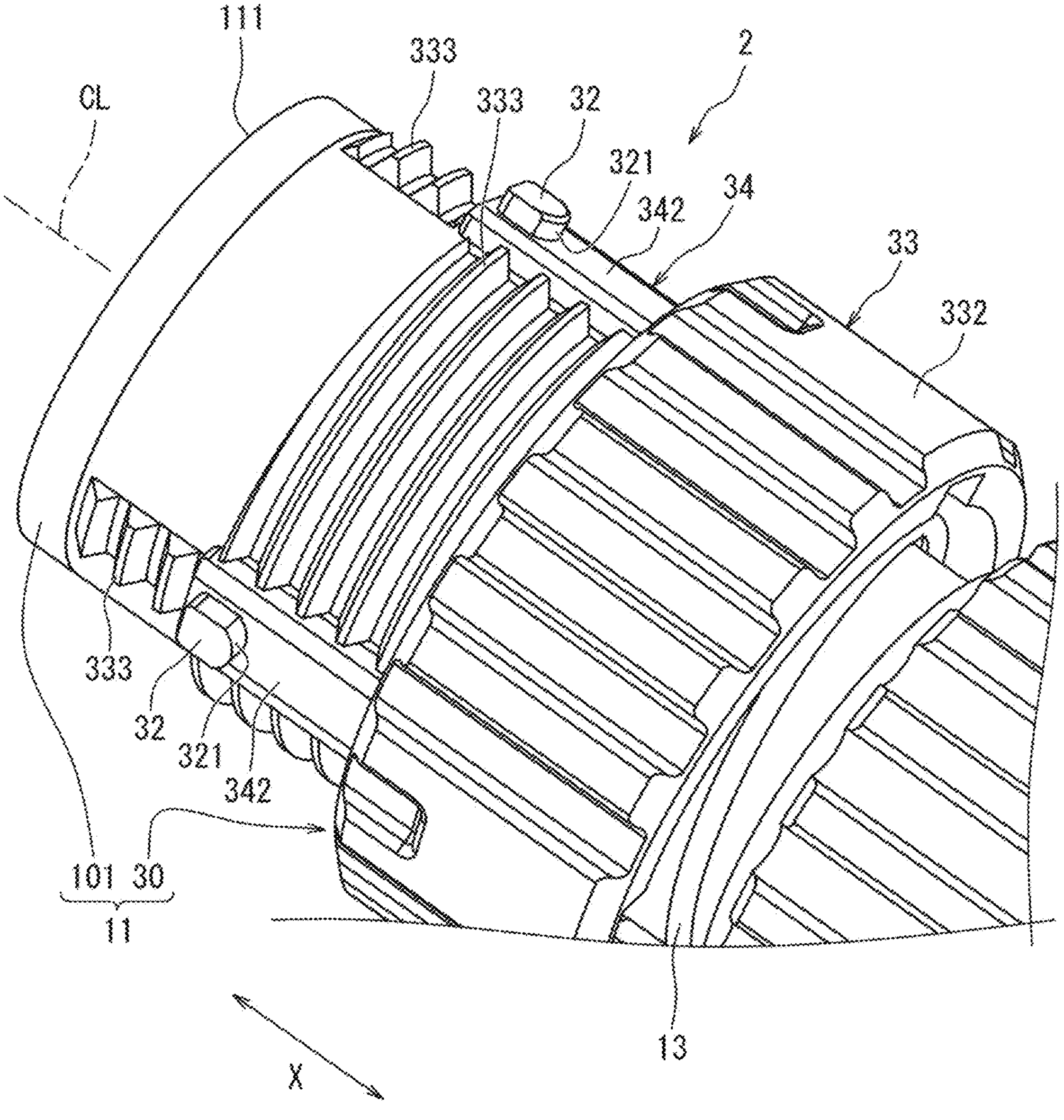
FIG. 3 is a perspective view illustrating a plug of the connector of FIG. 1.

As illustrated in FIG. 3, the claw portion 32 is provided in the second portion 342 of the second member 34 and protrudes radially outward from the second portion 342. In the present aspect, the first connection member 10 includes a plurality of claw portions 32. As an example, each of the claw portions 32 has a substantially rectangular parallelepiped shape and includes an end surface 321 which is far from the second connection member 20 in the first direction X and is curved. The male screw 333 is located between the claw portions 32 adjacent in the circumferential direction.

As an example, the biasing member 13 is configured by a coil spring. The biasing member 13 is farther from the socket 3 than the second member 34 in the first direction X in the gap 35 and biases the first member 33 and the second member 34 toward the direction approaching the socket 3.

As illustrated in FIG. 1 and FIG. 2, the second connection member 20 includes a second body portion 21 and connection groove portions 42 provided in the second body portion 21. The second body portion 21 extends along the first direction X and is configured to be connectable to the first body portion 11 of the first connection member 10. In the present aspect, the second body portion 21 includes a socket body 201 and a socket-side connection member 41 located at an end portion 211 close to the socket 3 in the first direction X of the socket body 201.

For example, the socket body 201 has a substantially columnar shape, and is configured to be accommodated in the recess 112 of the plug body 101. As illustrated in FIG. 3, the end portion 211 of the socket body 201 is provided with a plurality of accommodating portions 212 each accommodating a socket terminal (not illustrated). As illustrated in FIG. 1, the cable 4 is connected to an end portion of the socket body 201 far from the first connection member 10 in the first direction X. Each socket terminal is electrically connected to the cable 4. The accommodating portion 212 is configured to accommodate the plug terminal 14 in addition to the socket terminal. The plug terminal 14 and the socket terminal are connected in the accommodating portion 212, and the plug 2 and the socket 3 are electrically connected.

Figure 4:
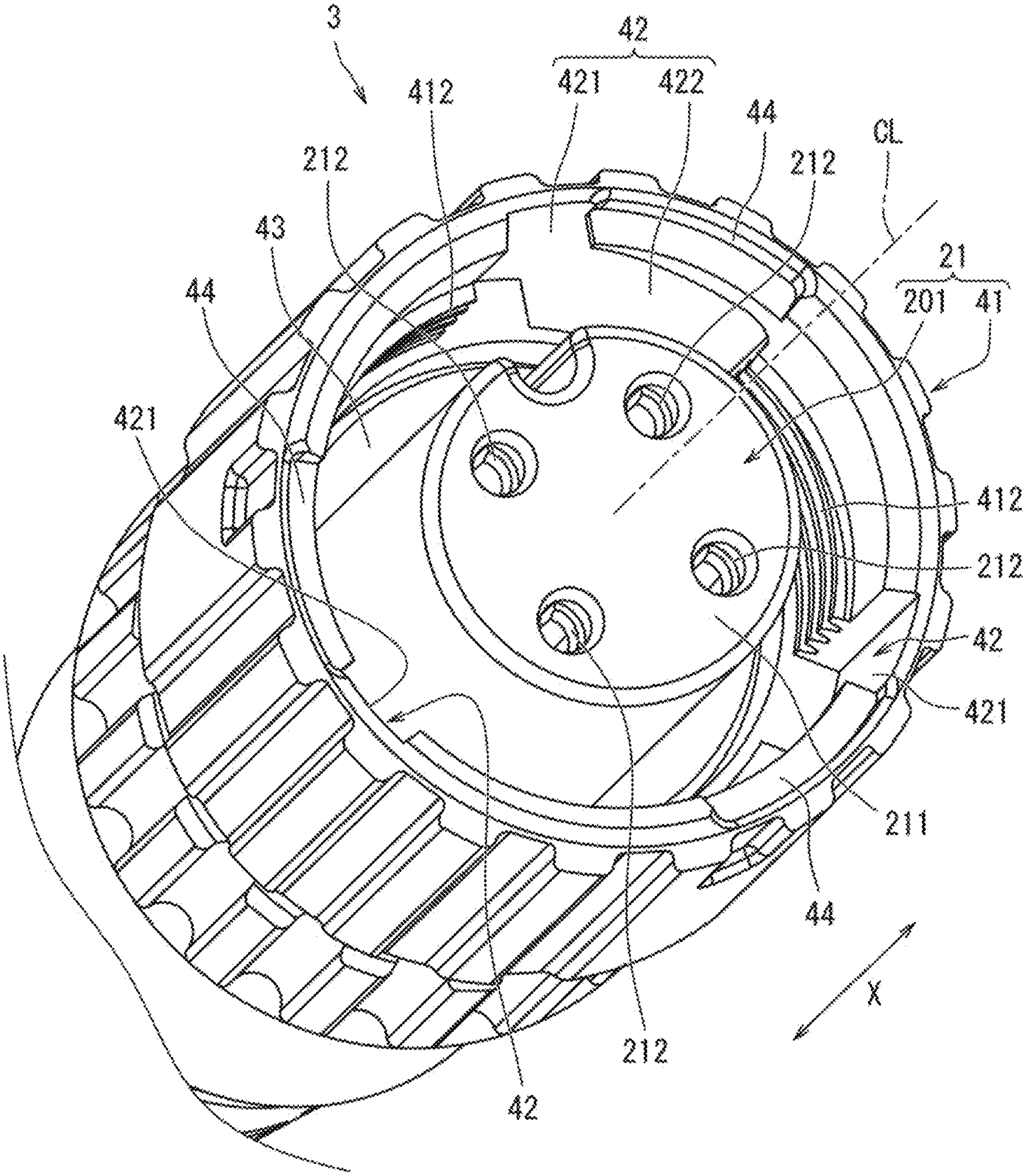
FIG. 4 is a perspective view illustrating a socket of the connector of FIG. 1.

As illustrated in FIGS. 2 and 4, for example, the socket-side connection member 41 has a substantially cylindrical shape, and a part of the socket-side connection member 41 is located outside the first body portion 11 in the radial direction. In the present aspect, the socket-side connection member 41 includes an end portion 414 which is far from the first connection member 10 in the first direction X and is connected and fixed to the socket body 201. A gap 43 for accommodating the socket body 201 in the recess 112 of the plug body 101 is formed between the socket-side connection member 41 and the socket body 201 in the radial direction. In a state where the socket body 201 is accommodated in the recess 112 of the plug body 101, the plug body 101, the first portion 331 of the first member 33 of the first connection member 10, and the second portion 342 of the second member 34 are located in the gap 43.

The socket-side connection member 41 includes an end portion 411 facing the first connection member 10 in the first direction X, the end portion 411 being provided with a restricting portion 44 provided at a position different from the first groove portion 421 of the connection groove portion 42 to be described later. The restricting portion 44 is configured to accommodate the claw portion 32 and to restrict the rotation of the socket 3 with respect to the plug 2 in the circumferential direction.

Figure 5:
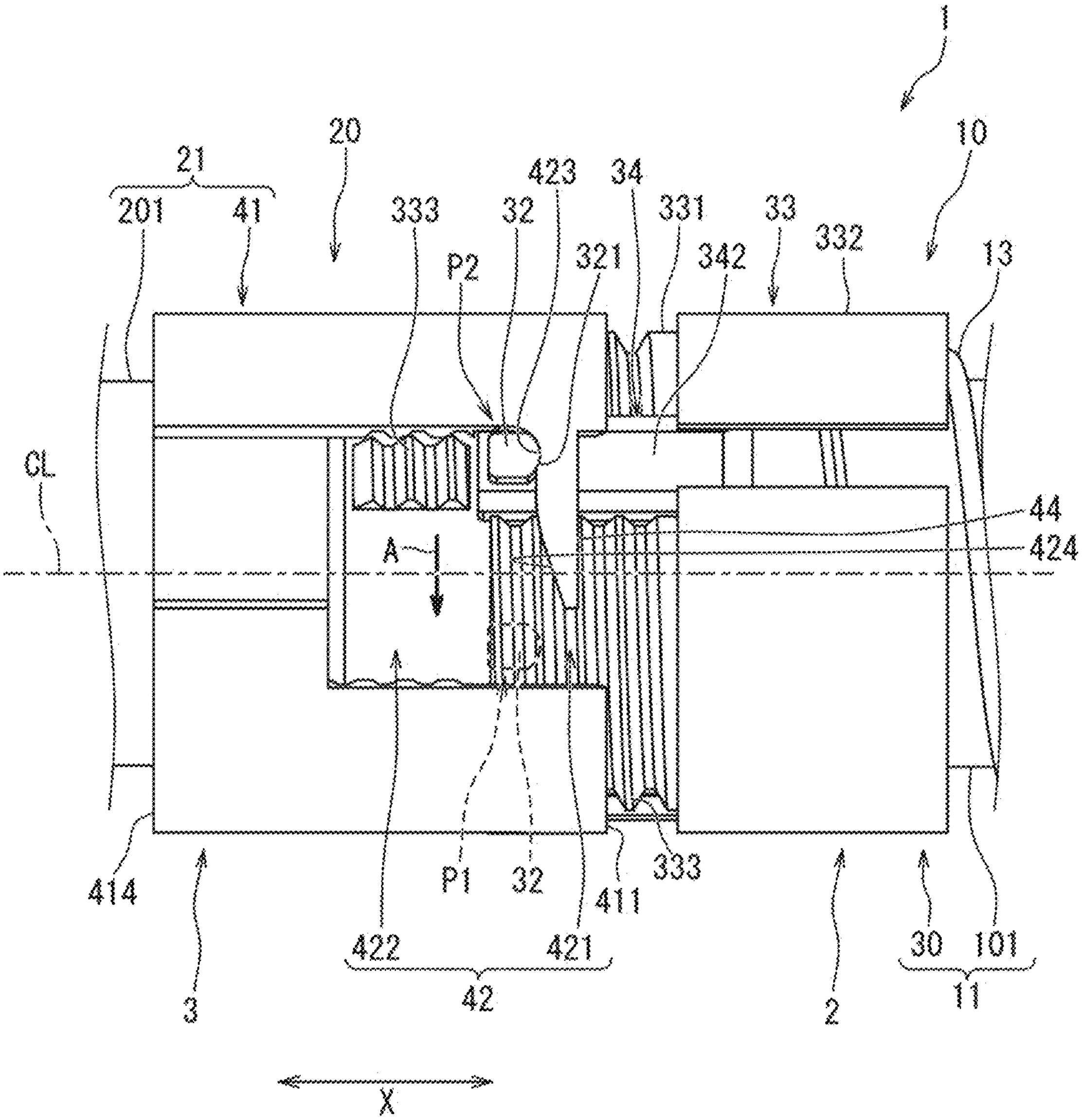
FIG. 5 is a plan view illustrating a state where a connection groove portion of the connector of FIG. 1 is exposed.

In the present aspect, as illustrated in FIG. 5, the restricting portion 44 is configured by a notch which extends along the circumferential direction and is configured to accommodate the claw portion 32 from the first direction X. The restricting portion 44 is adjacent to an upstream side of the first groove portion 421 in the circumferential direction and in a direction in which the second connection member 20 moves from the first position P1 to the second position P2 (indicated by an arrow A) and includes one end in the circumferential direction connected to the first groove portion 421. The restricting portion 44 has substantially the same length in circumferential direction as a second groove portion 422 described later.

The connection groove portion 42 is located in a portion 412 facing the plug 2 in the radial direction of the socket-side connection member 41, and is configured to accommodate the claw portion 32. In the present exemplary aspect, the socket-side connection member 41 is provided with three connection groove portions 42 respectively corresponding to three claw portions 32. As illustrated in FIG. 4, a female screw 413 that is fastenable to the male screw 333 of the plug 2 from the first direction X is provided between the connection groove portions 42 adjacent in the circumferential direction.

As illustrated in FIG. 5, the connection groove portion 42 includes a first groove portion 421 and a second groove portion 422.

The first groove portion 421 extends along the first direction X from the end portion 411 of the socket-side connection member 41 facing the first connection member 10 in the first direction X. The first groove portion 421 is configured to guide movement of the claw portion 32 in the first direction X in a state where the second connection member 20 is located at the first position P1. The second groove portion 422 is connected to an end portion of the first groove portion 421 far from the first connection member 10 in the first direction X.

The second groove portion 422 extends along the circumferential direction, and is configured that the claw portion 32 is movable in the circumferential direction. In the present aspect, when the claw portion 32 is located at one circumferential end of the second groove portion 422, the second connection member 20 is located at the first position P1, and when the claw portion 32 is located at the other circumferential end of the second groove portion 422, the second connection member 20 is located at the second position P2. The second groove portion 422 is configured to restrict movement of the claw portion 32 in the first direction X and in a direction approaching the plug 2 in a state where the second connection member 20 is located at the second position P2. In the present aspect, a recess 423 along a curved shape of the end surface 321 of the claw portion 32 is provided at an end portion of the second groove portion 422 closer to the plug 2 in the first direction X.

A guide surface 424 configured to guide movement of the claw portion 32 in the circumferential direction is provided between the first groove portion 421 and the recess 423 in the circumferential direction in the second groove portion 422. The guide surface 424 is curved while being inclined in a direction away from the plug 2 in the first direction X as being away from the first groove portion 421 in the circumferential direction.

When the plug 2 and the socket 3 are connected by the claw portion 32 of the first connection member 10 and the connection groove portion 42 of the second connection member 20, the second connection member 20 is located at the first position P1 by aligning the positions of the plug 2 and the socket 3 in the circumferential direction. In a state where the second connection member 20 is located at the first position P1, the plug 2 and the socket 3 are brought close to each other until the claw portion 32 reaches the second groove portion 422 through the first groove portion 421. When the claw portion 32 reaches the second groove portion 422, the second connection member 20 is rotated until the second connection member 20 no longer rotates with respect to the first connection member 10, and the second connection member 20 is moved from the first position P1 to the second position P2.

In a state where the plug 2 and the socket 3 are connected to each other, as illustrated in FIG. 2, a sealing member 50 seals between the first connection member 10 and the second connection member 20 to prevent contact of liquid, dust, or the like with the plug terminal and the socket terminal.

The connector 1 can exhibit the following advantageous effects.

The connector 1 includes the plug 2 including the first connection member 10 and the socket 3 including the second connection member 20 to which the first connection member 10 is detachably connected from the first direction X. The second connection member 20 is configured to be rotatable with respect to the first connection member 10 between the first position P1 where the first connection member 10 is detachable from the first direction X and the second position P2 where the first connection member 10 is not detachable from the first direction X in the circumferential direction with respect to the center line CL extending in the first direction X. The first connection member 10 includes the first body portion 11 extending along the first direction X and the claw portion 32 protruding from the first body portion 11 in the radial direction with respect to the center line CL. The second connection member 20 includes the second body portion 21 that extends along the first direction and is configured to be connectable to the first body portion 11, a part of the second body portion 21 being located outside the first body portion 11 in the radial direction, and a connection groove portion 42 which is located in a portion of the second body portion 21 facing the first body portion 11 and accommodates the claw portion 32. The connection groove portion 42 includes the first groove portion 421 and the second groove portion 422. The first groove portion 421 extends along the first direction from the end portion 411 of the second body portion 21 facing the first connection member 10 and is configured to guide the movement of the claw portion 32 in the first direction X in a state where the second connection member 20 is located at the first position P1. The second groove portion 422 is connected to the end portion of the first groove portion 421 far from the first connection member 10 in the first direction X, extends along the circumferential direction, and is configured that the claw portion 32 is movable in the circumferential direction, and is configured to restrict the movement of the claw portion 32 in the first direction X and in the direction approaching the plug 2 in a state where the second connection member 20 is located at the second position P2. The second body portion 21 includes the restricting portion 44 that is provided at a position different from the first groove portion 421 at the end portion 411 facing the first connection member 10 and is configured to accommodate the claw portion 32 and to restrict the rotation of the socket 3 with respect to the plug 2 in the circumferential direction. With such a configuration, even if a start position of rotational operation is wrong when the plug 2 and the socket 3 are connected, a relative rotation of the plug 2 and the socket 3 is restricted. As a result, it is possible to prevent a user from erroneously recognizing that the connection between the plug 2 and the socket 3 is normally completed.

The restricting portion 44 is configured by a notch that extends along the circumferential direction and is connected to the first groove portion 421, the notch being configured to accommodate the claw portion 32 from the first direction X.

With such a configuration, even if the start position of rotational operation is wrong when the plug 2 and the socket 3 are connected, it is possible to prevent restriction of the relative rotation of the plug 2 and the socket 3 toward a correct position while restricting the relative rotation of the plug 2 and the socket 3 away from a correct position.

The restricting portion 44 is adjacent to the upstream side of the first groove portion 421 in the circumferential direction and in the direction in which the second connection member 20 moves from the first position P1 to the second position P2. With such a configuration, it is possible to more reliably prevent the user from erroneously recognizing that the connection between the plug 2 and the socket 3 is normally completed.

The connector 1 may be configured as follows.

Figure 6:
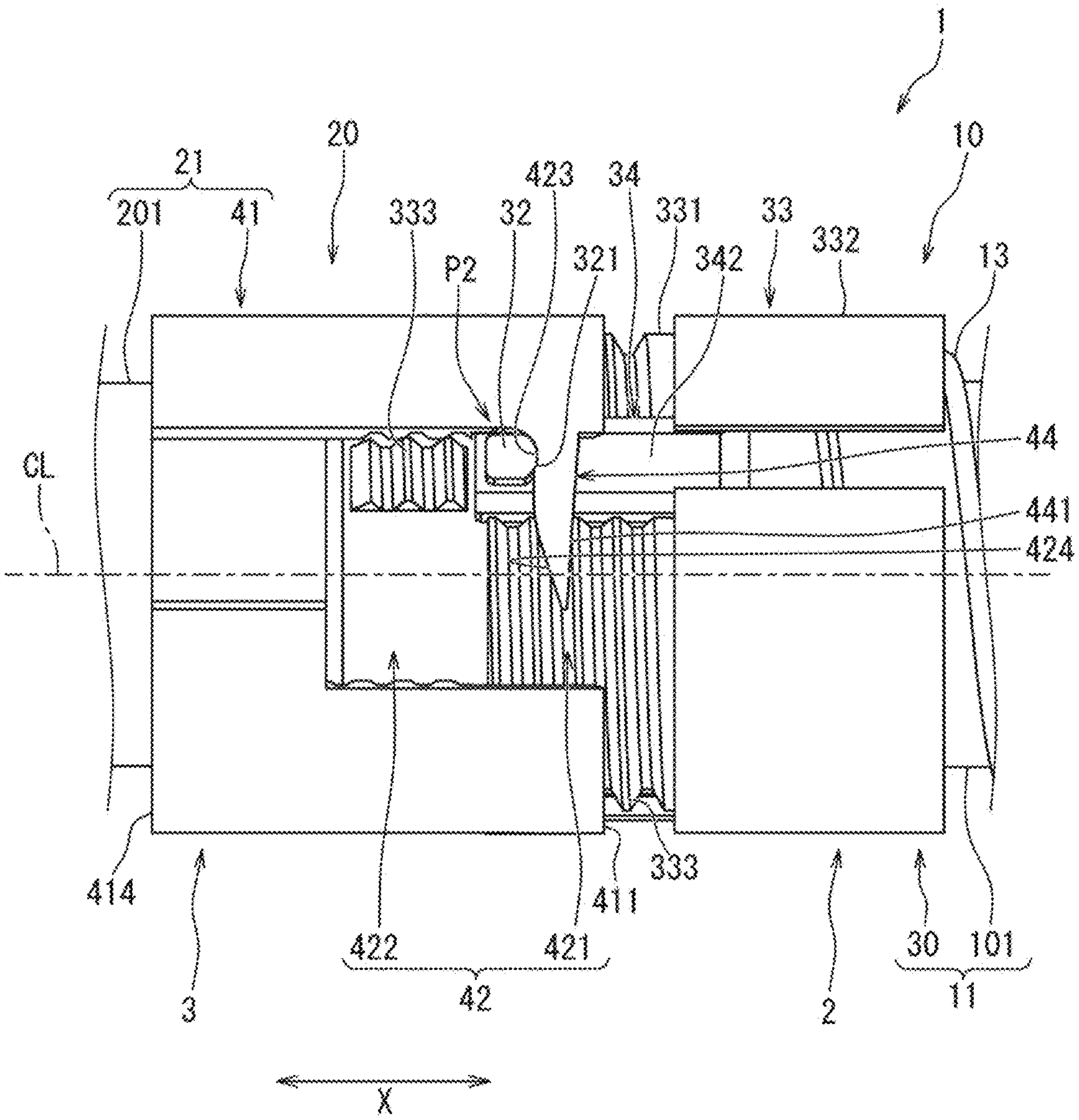
FIG. 6 is a plan view illustrating a first modification of the connector of FIG. 1.

As illustrated in FIG. 6, the restricting portion 44 may be configured to include an inclined surface 441. The inclined surface 441 is located to be opposable to the claw portion 32 in the first direction X and is inclined in a direction away from the first connection member 10 in the first direction X as approaching the first groove portion 421 in the circumferential direction. With such a configuration, the claw portion 32 accommodated in the restricting portion 44 can be guided toward the first groove portion 421. In the above aspect, the plug-side connection member 30 provided with the claw portion 32 is biased in the direction approaching the socket 3 by the biasing member 13. Therefore, the claw portion 32 accommodated in the restricting portion 44 can be more reliably guided toward the first groove portion 421.

Figure 7:
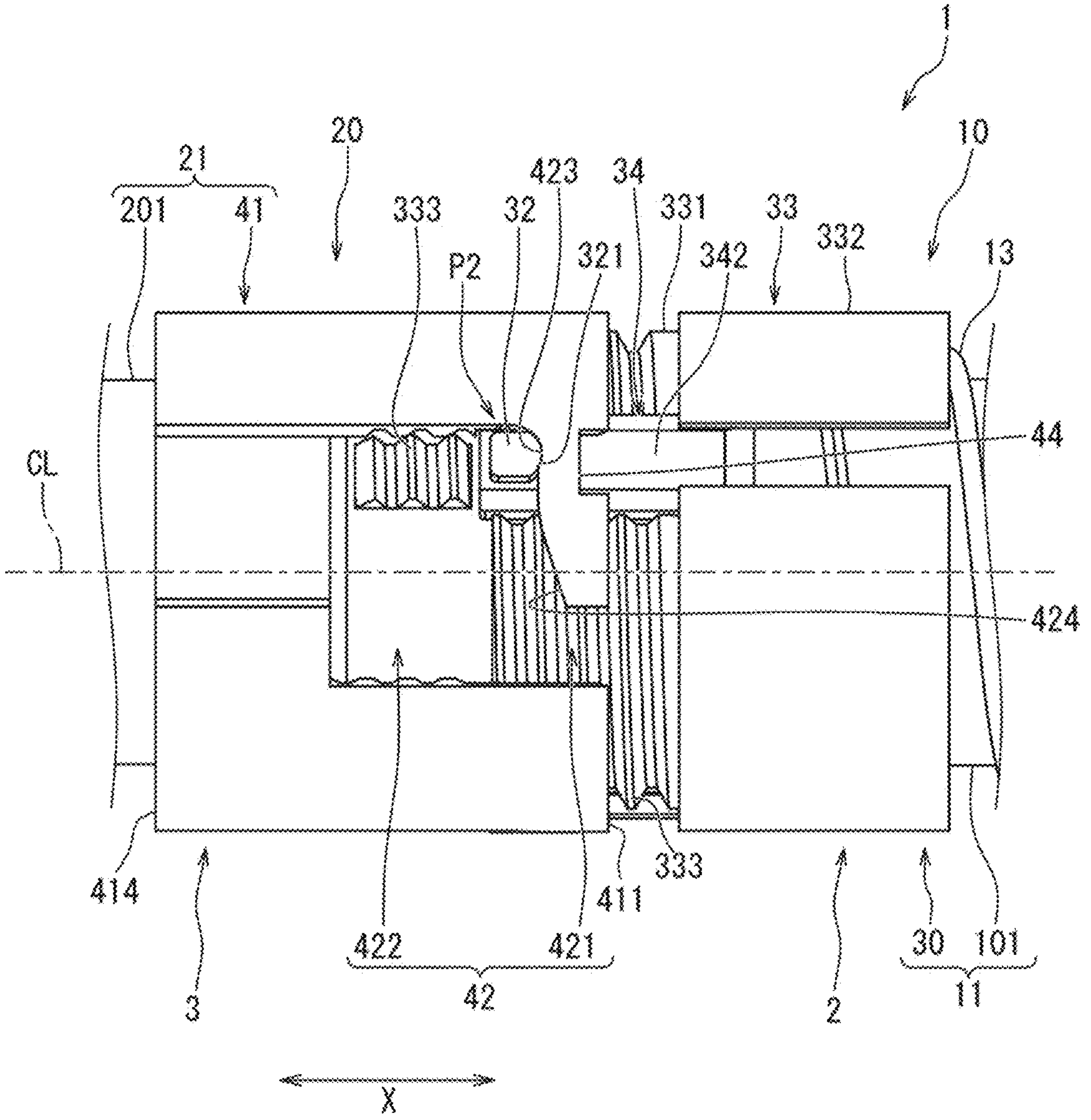
FIG. 7 is a plan view illustrating a second modification of the connector of FIG. 1.

The restricting portion 44 is not limited to the case where the restricting portion 44 is configured by a notch. For example, as illustrated in FIG. 7, the restricting portion 44 may be configured by a groove independent of the first groove portion 421, the groove being configured to accommodate the claw portion 32 from the first direction X. In the connector 1 of FIG. 7, the restricting portion 44 is opened to the end portion 411 of the socket-side connection member 41, and is located at a position overlapping the recess 423 of the second groove portion 422 when viewed along the first direction X. Since the restricting portion 44 of FIG. 7 restricts forward and reverse rotations of the accommodated claw portion 32 in the circumferential direction, it is possible to easily recognize an error in the start position of rotational operation.

The restricting portion 44 is not limited to the case where the restricting portion 44 is adjacent to the upstream side of the first groove portion 421 in the circumferential direction and in the direction in which the second connection member 20 moves from the first position P1 to the second position P2 (the direction of the arrow A in FIG. 5). The restricting portion 44 may be provided at any position of the second body portion 21 where the user can be prevented from erroneously recognizing that the connection between the plug and the socket is normally completed. For example, the restricting portion 44 may be provided adjacent to a downstream side of the first groove portion 421 in the direction of the arrow A in FIG. 5.

The connector 1 is configured that the plug 2 and the socket 3 are connectable by screw connection using the male screw 333 and the female screw 413, and the plug 2 and the socket 3 are connectable by snap-fit connection (bayonet connection) using the claw portion 32 and the connection groove portion 42, but is not limited thereto. For example, the connector 1 may be configured that the male screw 333 and the female screw 413 are omitted and the plug 2 and the socket 3 are connectable only by snap-fit connection.

Shapes and configurations of the plug 2 and the socket 3 are not limited to the above aspect, and may be freely changed within a range in which the present disclosure can be realized.

Various aspects of the present disclosure have been described above in detail with reference to the drawings. Finally, various aspects of the present disclosure will be described. In the following description, as an example, reference numerals are also added.

A connector 1 according to a first aspect of the present disclosure includes:

- a plug 2 including a first connection member 10; and
- a socket 3 including a second connection member 20 to which the first connection member 10 is detachably connected from a first direction, the second connection member 20 being configured to be rotatable with respect to the first connection member 10 between a first position P1 where the first connection member 10 is detachable from the first direction and a second position P2 where the first connection member 10 is not detachable from the first direction in a circumferential direction with respect to a center line CL extending in the first direction, the first connection member 10 includes:

- a first body portion 11 that extends along the first direction; and
- a claw portion 32 that protrudes from the first body portion 11 in a radial direction with respect to the center line CL, the second connection member 20 includes:

- a second body portion 21 that extends along the first direction and is configured to be connectable to the first body portion 11, a part of the second body portion 21 being located outside the first body portion 11 in the radial direction; and
- a connection groove portion 42 which is located in a portion of the second body portion 21 facing the first body portion 11 and accommodates the claw portion 32, the connection groove portion 42 includes:

- a first groove portion 421 that extends along the first direction from an end portion 411 of the second body portion 21 facing the first connection member 10 and is configured to guide movement of the claw portion 32 in the first direction in a state where the second connection member 20 is located at the first position P1; and
- a second groove portion 422 that is connected to an end portion of the first groove portion 421 far from the first connection member 10 in the first direction, extends along the circumferential direction, and is configured that the claw portion 32 is movable in the circumferential direction, and is configured to restrict movement of the claw portion 32 in the first direction and in a direction approaching the plug 2 in a state where the second connection member 20 is located at the second position P2, and the second body portion 21 includes

- a restricting portion 44 that is provided at a position different from the first groove portion 421 at an end portion facing the first connection member 10 and is configured to accommodate the claw portion 32 and to restrict rotation of the socket 3 with respect to the plug 2 in the circumferential direction.

In a connector 1 according to a second aspect of the present disclosure, in the connector 1 according to the first aspect, the restricting portion 44 is configured by a notch that extends along the circumferential direction and is connected to the first groove portion 421, the notch being configured to accommodate the claw portion 32 from the first direction.

In a connector 1 according to a third aspect of the present disclosure, in the connector 1 according to the second aspect, the restricting portion 44 includes an inclined surface 441 that is located to be opposable to the claw portion 32 in the first direction and is inclined in a direction away from the first connection member 10 in the first direction as approaching the first groove portion 421 in the circumferential direction.

In a connector 1 according to a fourth aspect of the present disclosure, in the connector 1 according to the first aspect, the restricting portion 44 is configured by a groove independent of the first groove portion 421, the groove being configured to accommodate the claw portion 32 from the first direction.

In a connector 1 according to a fifth aspect of the present disclosure, in the connector 1 according to any one of the first to fourth aspects, the restricting portion 44 is adjacent to an upstream side of the first groove portion 421 in the circumferential direction and in a direction in which the second connection member 20 moves from the first position P1 toward the second position P2.

By appropriately combining any aspects or modifications among the various aspects or modifications, the effects of the respective aspects or modifications can be achieved. In addition, combinations of aspects, combinations of examples, or combinations of aspects and examples are possible, and combinations of features in different aspects or examples are also possible.

Although the present disclosure has been fully described in connection with preferred aspects with reference to the accompanying drawings, various modifications and corrections will be apparent to those skilled in the art. Such modifications and corrections are to be understood as being included within the scope of the present disclosure as set forth in the appended claims.

The connector of the present disclosure can be applied to, for example, an automobile machine tool.

The invention claimed is:

1. A connector, characterized by comprising:

a plug including a first connection member; and a socket including a second connection member to which the first connection member is detachably connected from a first direction, the second connection member being configured to be rotatable with respect to the first connection member between a first position where the first connection member is detachable from the first direction and a second position where the first connection member is not detachable from the first direction in a circumferential direction with respect to a center line extending in the first direction, wherein the first connection member includes:

a first body portion that extends along the first direction; and a claw portion that protrudes from the first body portion in a radial direction with respect to the center line, the second connection member includes:

a second body portion that extends along the first direction and is configured to be connectable to the first body portion, a part of the second body portion being located outside the first body portion in the radial direction; and a connection groove portion which is located in a portion of the second body portion facing the first body portion and accommodates the claw portion, the connection groove portion includes:

a first groove portion that extends along the first direction from an end portion of the second body portion facing the first connection member and is configured to guide movement of the claw portion in the first direction in a state where the second connection member is located at the first position; and a second groove portion that is connected to an end portion of the first groove portion far from the first connection member in the first direction, extends along the circumferential direction, and is configured that the claw portion is movable in the circumferential direction, and is configured to restrict movement of the claw portion in the first direction and in a direction approaching the plug in a state where the second connection member is located at the second position, and the second body portion includes a restricting portion that is provided at a position different from the first groove portion at the end portion facing the first connection member and is configured to accommodate the claw portion and to restrict rotation of the socket with respect to the plug in the circumferential direction.

2. The connector according to claim 1, wherein the restricting portion is configured by a notch that extends along the circumferential direction and is connected to the first groove portion; the notch being configured to accommodate the claw portion from the first direction.

3. The connector according to claim 2, wherein the restricting portion includes an inclined surface that is located to be opposable to the claw portion in the first direction and is inclined in a direction away from the first connection member in the first direction as approaching the first groove portion in the circumferential direction.

4. The connector according to claim 1, wherein, the restricting portion is configured by a groove independent of the first groove portion, the groove being configured to accommodate the claw portion from the first direction.

5. The connector according to claim 1, wherein, the restricting portion is adjacent to an upstream side of the first groove portion in the circumferential direction and in a direction in which the second connection member moves from the first position toward the second position.

* * * * *